United States Patent [19]

Ferguson et al.

[11] Patent Number: 4,727,360

[45] Date of Patent: Feb. 23, 1988

[54] FREQUENCY-DIVIDING TRANSPONDER AND USE THEREOF IN A PRESENCE DETECTION SYSTEM

[75] Inventors: Lucian G. Ferguson, Largo; Lincoln H. Charlot, Jr., St. Petersburg, both of Fla.

[73] Assignee: Security Tag Systems, Inc., St. Petersburg, Fla.

[21] Appl. No.: 888,877

[22] Filed: Jul. 31, 1986

Related U.S. Application Data

[63] Continuation-in-part of Ser. No. 775,568, Sep. 13, 1985.

[51] Int. Cl.$^4$ .............................................. G08B 13/24
[52] U.S. Cl. .............................. 340/572; 307/219.1; 342/27
[58] Field of Search .............................. 340/572, 551; 307/219.1; 342/27; 363/173, 170, 157

[56] References Cited

U.S. PATENT DOCUMENTS

| | | | |
|---|---|---|---|
| 4,298,862 | 11/1981 | Gregor et al. | 340/572 |
| 4,314,373 | 2/1982 | Sellers | 455/20 |
| 4,481,428 | 11/1984 | Charlot, Jr. | 307/219 |
| 4,484,184 | 11/1984 | Gregor et al. | 340/572 |
| 4,495,487 | 1/1985 | Kavesh et al. | 340/572 |
| 4,510,489 | 4/1985 | Anderson, III et al. | 340/572 |
| 4,510,490 | 4/1985 | Anderson, III et al. | 340/572 |
| 4,553,136 | 11/1985 | Anderson, III et al. | 340/572 |

FOREIGN PATENT DOCUMENTS

2017454 9/1979 United Kingdom .

OTHER PUBLICATIONS

Mitchell et al., "Magnetoelastic Effects in $Fe_{71}Co_9B_{20}$ Glassy Ribbons", J. Appl. Phys. 50 (3), Mar. 1979, p. 1627.

Modzelewski et al., "Magnetomechanical Coupling and Permeability in Transversely Annealed Metglas 2605 Alloys", IEEE Transactions on Magnetics, vol. MAG-17, No. 6, Nov. 1981, p. 2837.

M. J. Feigenbaum, J. Stat. Phys., 19, p. 25, 1978.

P. S. Linsay, Physical Review Letters, vol. 47, No. 19, pp. 1349–1352, Nov. 1981.

Feigenbaum, J. Stat. Phys., 21, p. 669, 1979.

*Primary Examiner*—Glen R. Swann, III
*Attorney, Agent, or Firm*—Edward W. Callan

[57] ABSTRACT

A batteryless, portable, transponder useful in a tag for a presence detection system. The transponder detects electromagnetic radiation at a first predetermined frequency and responds to said detection by transmitting electromagnetic radiation at a second frequency that is a subharmonic of the first frequency. The transponder includes an amorphous magnetic material component for storing energy from the electromagnetic radiation detected at the first frequency for transmission as the electromagnetic radiation transmitted at the second frequency. In one embodiment the transponder includes a thin, flat ribbon of low coercivity magnetostrictive amorphous magnetic material having a transverse uniaxial magnetic anisotropy defining a magnetomechanical resonant frequency "f" in accordance with the dimensions of the ribbon, when in the presence of a magnetic bias field of a predetermined intensity, wherein the ribbon responds to the detection of electromagnetic radiation having a frequency "2f" by transmitting electromagnetic radiation at a subharmonic of the frequency "2f"; and means for biasing the ribbon with the predetermined magnetic bias field. In another embodiment, the transponder consists of a single resonant circuit including a nonlinear inductor having a core made of amorphous magnetic material; and a capacitance connected in series with the inductor to define the resonant circuit. The core of the nonlinear inductor includes an elongated thin, flat ribbon of low coercivity amorphous mangetic material. It has been observed that this resonant circuit exhibits a bifurcated frequency-division characteristic in relation to the amplitude of the detected electromagnetic radiation at the first predetermined frequency, whereby additional frequency divisions occur as the amplitude is increased. A coded tag includes two amorphous magnetic material transponders that detect electromagnetic radiation at different frequencies.

20 Claims, 22 Drawing Figures

FREQUENCY-DIVIDING TRANSPONDER AND USE THEREOF IN A PRESENCE DETECTION SYSTEM

CROSS REFERENCE TO A RELATED APPLICATION

This application is a continuation-in-part of co-pending U.S. patent application Ser. No. 775,568, filed Sept. 13, 1985.

BACKGROUND OF THE INVENTION

The present invention generally pertains to frequency-dividing transponders and is particularly directed to an improved transponder for use in a presence detection system.

A presence detection system utilizing a frequency divider as a transponder is described in United Kingdom Patent Application No. 2,017,454. Such system includes a transmitter for transmitting a scanning signal at a first frequency in a surveillance zone; a transponder including an active frequency divider for detecting electromagnetic radiation at the first frequency and for transmitting a presence signal in response thereto at a second frequency to thereby detect the presence of the transponder in the surveillance zone. The electronic tags that the transponders are contained within are attached to articles of which detection is desired for enabling detection of the presence of such articles in the surveillance zone. Such presence detection systems are useful for detecting shoplifting, as well as for other applications.

A few examples of such other applications include detecting the presence of a person or vehicle carrying a transponder in a surveillance zone; detecting the presence of articles bearing transponders within a surveillance zone along an assembly line; and detecting the presence of keys attached to transponders in a surveillance zone at the exit of an area from which such keys are not to be removed.

The transponder is encased in a small tag that can be attached to an article in such a manner that it cannot be removed from the article without a special tool. When used in a shoplifting detection system, a sales clerk uses a special tool to remove the tag from the merchandise that is paid for; and the surveillance zone is located near the doorway for enabling detection of articles from which the tags have not been removed.

The transponder described in the aforementioned patent application includes a complex frequency divider that must be powered by an expensive long-life miniature battery.

A frequency divider that may be operated without a battery or any external power supply and is suited for use as a transponder in a presence detection system is described in U.S. Pat. No. 4,481,428. Such frequency divider includes a first circuit that is resonant at a first frequency for receiving electromagnetic radiation at the first frequency; a second circuit that is resonant at a second frequency that is a subharmonic of the first frequency for transmitting electromagnetic radiation at the second frequency; and a semiconductor switching device having gain coupling the first and second circuits for causing the second circuit to transmit electromagnetic radiation at the second frequency solely in response to unrectified energy at the first frequency provided in the first circuit upon receipt of electromagnetic radiation at the first frequency.

Nonlinearities such as those due to saturation and hysterisis in the magnetization curves of thin magnetic alloy ribbons, including permalloy and untreated Metglas, are well-suited for producing higher-order harmonics, and this effect is described in French Pat. No. 763,681 to Picard and U.S. Pat. No. 4,298,862 to Gregor, et.al. It is not believed possible, however, to be able to create subharmonics and frequency-division behavior with such ribbons by utilizing only the inherant nonlinearities of their magnetization curves.

SUMMARY OF THE INVENTION

The present invention provides an improved portable, batteryless transponder that is useful in a presence detection system. The improved frequency divider of the present invention is less complex and less expensive than the frequency divider described in the aforementioned U.S. Pat. No. 4,481,428, as well as being smaller, lighter, and easier to conceal.

The present invention is a batteryless, portable transponder for detecting electromagnetic radiation at a first predetermined frequency and responding to said detection by transmitting electromagnetic radiation at a second frequency that is a subharmonic of the first frequency, comprising an amorphous magnetic material component for storing energy from the electromagnetic radiation detected at the first frequency for transmission as the electromagnetic radiation transmitted at the second frequency.

In one preferred embodiment of the present invention, the transponder comprises of a thin, flat ribbon of low coercivity magnetostrictive (also known as magnetoelastic) amorphous magnetic material having a transverse uniaxial magnetic anisotropy defining a magnetomechanical resonant frequency "f" in accordance with the dimensions of the ribbon when in the presence of a magnetic bias field of a predetermined intensity, wherein the ribbon responds to the detection of electromagnetic radiation having a frequency "2f" by transmitting electromagnetic radiation at a subharmonic of the frequency "2f"; and means for biasing the ribbon with the predetermined magnetic bias field. "Magnetomechanical" is characteristic of the uniaxial magnetic anisotropy that is necessary for a large interaction between stress and strain and the orientation of the magnetic moment within the ribbon.

In another preferred embodiment, the transponder includes a single resonant circuit including a nonlinear inductor having a core made of amorphous magnetic material; and a capacitance connected in series with the inductor to define a resonant circuit that detects electromagnetic radiation at a first predetermined frequency and responds to said detection by transmitting electromagnetic radiation at a second frequency that is a subharmonic of the first frequency.

In one preferred embodiment of the single resonant circuit transponder, the resonant circuit further includes a second inductor connected in series with the nonlinear inductor and the capacitance to define the resonant circuit and having a coil that is positioned so that the second inductor is not mutually coupled to the nonlinear inductor.

The resonant circuit may consist of either the nonlinear inductor and the capacitance or the nonlinear and second inductors and the capacitance.

In a preferred embodiment of the frequency divider, wherein the core of the nonlinear inductor includes an elongated thin flat ribbon of low coercivity amorphous magnetic material, it has been observed that the resonant circuit exhibits a bifurcated frequency-division characteristic in relation to the amplitude of the detected electromagnetic radiation at the first predetermined frequency, whereby additional frequency divisions occur as the amplitude is increased. This bifurcation characteristic is utilized in a preferred embodiment of a presence detection system according to the present invention that uses a tag containing such embodiment of the frequency divider.

Additional features of the present invention are described with relation to the description of the preferred embodiments.

DESCRIPTION OF THE PREFERRED EMBODIMENTS

Figure 1A:
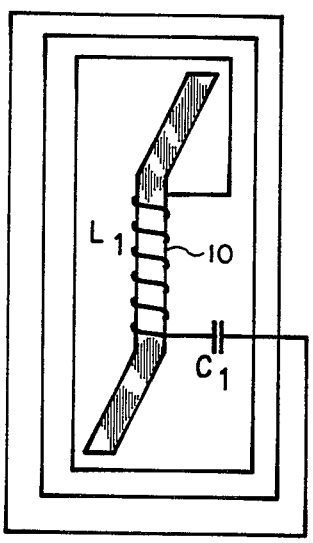
FIG. 1A illustrates one preferred embodiment of the frequency divider of the present invention.
Figure 1B:
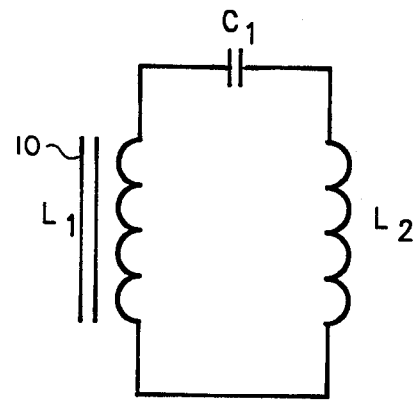
FIG. 1B is an equivalent circuit of the frequency divider of FIG. 1A.

Referring to FIGS. 1A and 1B, one preferred embodiment of the frequency divider of the present invention consists of a nonlinear inductor L1, a second inductor L2 and a capacitance C1, all connected in series with each other to define a series resonant circuit. The values of these components are chosen to define a series resonant circuit that detects electromagnetic radiation at a first predetermined frequency and responds to said detection by transmitting electromagnetic radiation at a second frequency that is a subharmonic of the first frequency.

The nonlinear inductor L1 is constructed by closely winding the required number of turns of insulated wire around a core 10 that includes an elongated thin flat ribbon of low-coercivity amorphous magnetic material, such as an alloy sold by Allied-Signal Inc. of Morristown, N.J. that is identified as "METGLAS 2714A". METGLAS is a trademark of Allied-Signal Inc. In order to achieve the very low demagnetizing factor necessary for operation, the ratio of the overall length of the ribbon 10 to the square root of the cross-sectional area of the ribbon should be at least one-hundred-fifty to one.

The coil of the second inductor L2 is wound around the perimeter of the circuit as shown in FIG. 1A, and is positioned so as not to mutually couple the second inductor L2 to the nonlinear inductor L1.

Figure 2A:
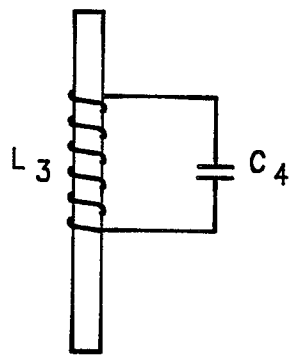
FIG. 2A illustrates an alternative preferred embodiment of the frequency divider of the present invention.
Figure 2B:
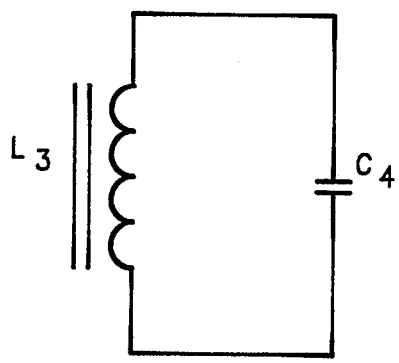
FIG. 2B is an equivalent circuit of the frequency divider of FIG. 2A.

An alternative preferred embodiment of the frequency divider of the present invention is shown in FIGS. 2A and 2B. This embodiment consists of a nonlinear inductor L3 and a capacitance C4 connected in series with each other to define a series resonant circuit. The values of these components are chosen to define a series resonant circuit that detects electromagnetic radiation at a first predetermined frequency and responds to said detection by transmitting electromagnetic radiation at a second frequency that is a subharmonic of the first frequency. The nonlinear inductor L3 is constructed in the same manner as the nonlinear inductor L1 in the frequency divider shown in FIGS. 1A and 1B.

The frequency divider of FIG. 2A is not as efficient as the frequency divider of FIG. 1A because of a smaller capture area; but it is simpler and less costly to manufacture.

The following discussion pertains to a possible theory of operation of the frequency divider of the present invention.

Figure 3A:
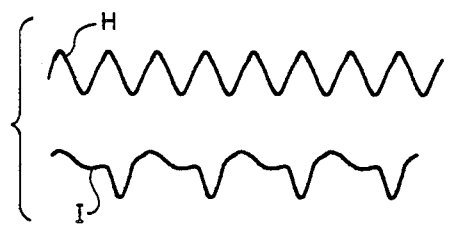
FIG. 3A shows a waveform H of the electromagnetic radiation at the first predetermined frequency detected by the nonlinear inductor at a first amplitude of said detected electromagnetic radiation and a waveform I of the current flowing in the frequency divider of FIG. 1A when said first amplitude of eletromagnetic radiation at the first frequency is detected by the nonlinear inductor.
Figure 3B:
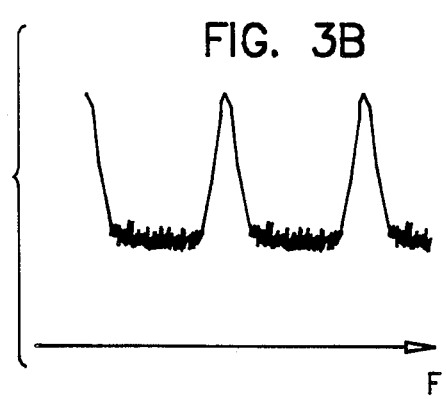
FIG. 3B shows the frequency spectrum for the electromagnetic radiation transmitted by the frequency divider of FIG. 1A in response to detection of electromagnetic radiation of the first amplitude as shown in FIG. 3A.
Figure 4A:
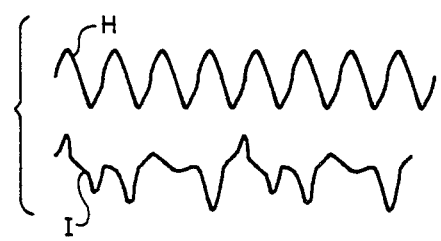
FIG. 4A shows a waveform H of the electromagnetic radiation at the first predetermined frequency detected by the nonlinear inductor at a second amplitude of said detected electromagnetic radiation greater than that shown in FIG. 3A and a waveform I of the current flowing in the frequency divider of FIG. 1A when said second amplitude of electromagnetic radiation at the first frequency is detected by the nonlinear inductor.
Figure 4B:
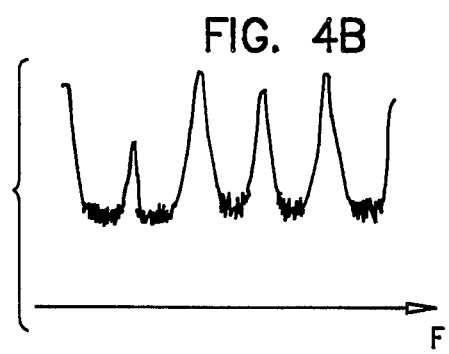
FIG. 4B shows the frequency spectrum for the electromagnetic radiation transmitted by the frequency divider of FIG. 1A in response to detection of electromagnetic radiation of the second amplitude as shown in FIG. 4A.
Figure 5A:
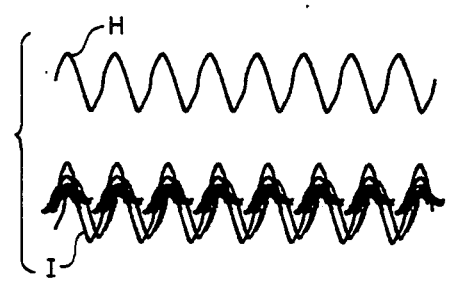
FIG. 5A shows a waveform H of the electromagnetic radiation at the first predetermined frequency detected by the nonlinear inductor at a third amplitude of said detected electromagnetic radiation greater than that shown in FIG. 4A and a waveform I of the current flowing in the frequency divider of FIG. 1A when said third amplitude of electromagnetic radiation at the first frequency is detected by the nonlinear inductor.
Figure 5B:
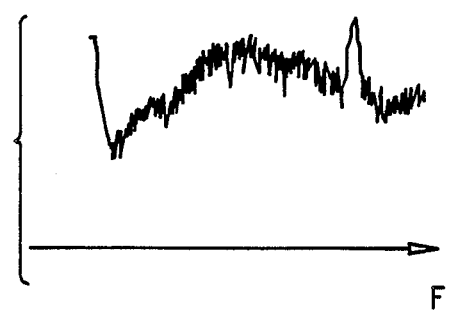
FIG. 5B shows the frequency spectrum for the electromagnetic radiation transmitted by the frequency divider of FIG. 1A in response to detection of electromagnetic radiation of the third amplitude as shown in FIG. 5A.

FIG. 3A shows the relative amplitude of a waveform H of the electromagnetic radiation at the first predetermined frequency detected by the nonlinear inductor and a waveform I of the current flowing in the resonant circuit of FIG. 1A. FIG. 3B is the corresponding frequency spectrum of the current in the resonant circuit of FIG. 1A. In a similar manner, FIGS. 4A and 4B and 5A and 5B show the result of increasing the amplitude of the interrogating electromagnetic field. The circuit of FIG. 1A undergoes progressive stages of frequency division as a function of the amplitude of the detected electromagnetic radiation at the first predetermined frequency and eventually reaches the chaotic state shown in FIGS. 5A and 5B.

A recent theory by M. J. Feigenbaum published in (M. J. Feigenbaum, J. Stat. Phys. 19, page 25, 1978 and Feigenbaum, J. Stat. Phys. 21, page 665, 1979), regarding nonlinear systems which exhibit period-doubling, predicts that these systems should behave in a universal manner independent of the precise equations which govern their dynamics. In (P. S. Linsay, Physical Review Letters, Vol. 47, No. 19, pp. 1349–52, Nov. 1981), Lindsay summarizes Feigenbaum's theory as follows:

Consider a system described by the coupled differential equations.

$$dx_i/dt = F_i(X_1, X_2, \ldots, X_n, \lambda), \quad i=1,2,\ldots,n, \qquad \text{(Eq. 1)}$$

The $X_i(t)$ are periodic with period $T_n = 2^n T_o$ at $\lambda = \lambda_n$.

For example in the circuit of FIG. 1A, the $X_i$ correspond to charge and current flowing in the circuit and $\lambda$ is the amplitude of the driving voltage. The theory predicts that the modulation parameter, $\lambda$, should asymptotically satisfy the recurrence relation.

$$(\lambda_{n+1} - \lambda_n)/(\lambda_{n+2} - \lambda_{n+1}) = \delta \qquad \text{(Eq. 2)}$$

$\delta$ is a universal convergence rate that depends only on the nature of $F_i$ near an extremum. For a quadratic extremum $\delta = 4.669 \ldots$ when n is large, the odd components of the Fourier spectrum are related by $$X^{(n+1)}_{(2k+1)} \cong \frac{1}{2a}\left|1 - i(-1)^k \left(\frac{1 - i(-1)^k}{a}\right)\right| X \sum_{k'} \frac{1}{2\pi} \frac{X(2k'+1)(n)}{i(2k'+1) - \frac{1}{2}(2k+1)} \qquad \text{(Eq. 3)}$$

The quantity $X_{(2k+1)}^{(n)}$ is the complex Fourier amplitude for the frequency $(2k+1)/2^n T_o$ and $\alpha = 2.5029 \ldots$ is the universal rescaling factor. Once a Fourier component appears at a particular frequency it is predicted that it will remain essentially constant through any succeeding frequency divisions.

Figure 6:
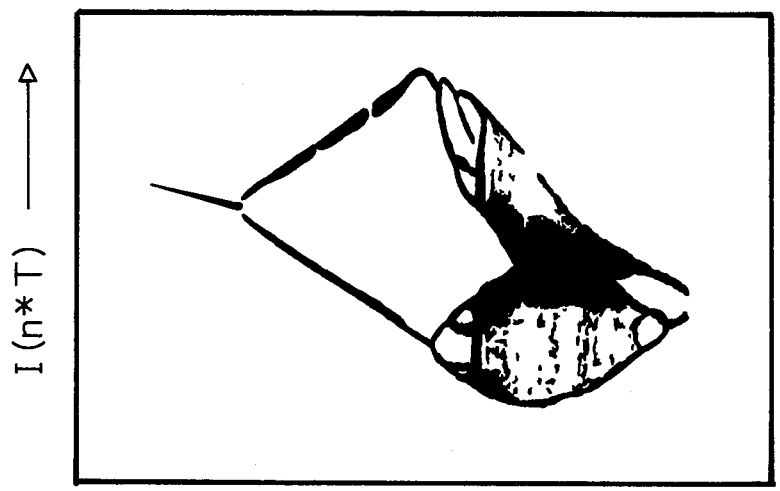
FIG. 6 is a frequency-division bifurcation diagram for the frequency divider of FIG. 1A as observed on an oscilloscope.

FIG. 6 is a typical real-time bifurcation diagram of the resonant circuit of FIG. 1A. This diagram is the result of sampling and displaying the instantaneous current, i(n*T), flowing in the series resonant circuit of FIG. 1A at the beginning of each cycle of the detected electromagnetic radiation at the first predetermined frequency on the Y-axis of an oscilloscope. At the same time, the amplitude of the detected electromagnetic radiation at the first predetermined frequency is slowly varied and displayed along the X-axis. The diagram is useful because it clearly reveals threshold values of amplitude for progressive frequency-division bifurcations, convergence rate, rescaling factor, and the onset of chaotic behavior. Bifurcations at f/2, f/4, and f/8 are visible, as well as a window at f/5 in the chaotic region. This behavior may be exploited as a charcteristic signature of the invention.

A numerical model has been developed to further analyze the circuit of FIG. 1A. The flux $\phi_B$, through the nonlinear inductor L1 is derived from the field generated by the current i(t), flowing through the coil surrounding it and external magnetic field, such as the earth's magnetic field. The external steady magnetic field is equivalent to adding a D.C. component to the current saturating the nonlinear inductor L1.

$$i_{eq}(t) = i(t) + i_{dc} \qquad \text{(Eq. 4)}$$

This biasing effect adds an asymmetry to the saturation curve of the inductor required for subharmonic generation. In the nonlinear inductor L1 of FIG. 1A, the hysterisis effects are small and can be neglected whereby the relationship between $\phi_B$ and $i_{eq}$ is a single-valued function, to wit:

$$\text{if } -i_c < i_{eq} < i_c \text{ then } \phi_B = M_1 i_{eq} \qquad \text{(Eq. 5)}$$

$$\text{if } i_{eq} > i_c \text{ then } \phi_B = M_0 i_{eq} + (I_{Bs} - M_0 i_c) \qquad \text{(Eq. 6)}$$

$$\text{if } i_{eq} < -i_c \text{ then } \phi_B = M_0 i_{eq} - (I_{Bs} - M_0 i_c) \qquad \text{(Eq. 7)}$$

$\phi_B$ is the saturation flux; and $i_c$ is the saturation current.

In order to solve the circuit equations we must know $d\phi_B/dt$ as a function of the current $i_{eq}$. This is accomplished by differentiating the previous equations and substituting $i + i_{dc}$ for $i_{eq}$.

$$\text{if } -i_c < (i + i_{dc}) < i_c \text{ then } d\phi_B/dt = M_1 di/dt \qquad \text{(Eq. 8)}$$

$$\text{if } (i + i_{dc}) > i_c \text{ then } d\phi_B/dt = M_0 di/dt \qquad \text{(Eq. 9)}$$

$$\text{if } (i + i_{dc}) < -i_c \text{ then } d\phi_B/dt = M_0 di/dt \qquad \text{(Eq. 10)}$$

It is now possible to write the differential equations describing the conditions in the resonant circuit of FIG. 1A as follows:

$$E \sin Wt = L_2 di/dt + Ri + M(i)di/dt + V_c \qquad \text{(Eq. 11)}$$

$$i = C dV_c/dt \qquad \text{(Eq. 12)}$$

W is $2\pi$ times the frequency of the detected electromagnetic radiation at the first predetermined frequency; E is the amplitude of said detected electromagnetic radiation; R is the wire resistance, and $V_c$ is the voltage across the capacitor C1. These are coupled, nonlinear differential equations which may be solved using a numerical technique such as the Runge-Kutta technique to obtain current and voltage as a function of time.

Figure 7:
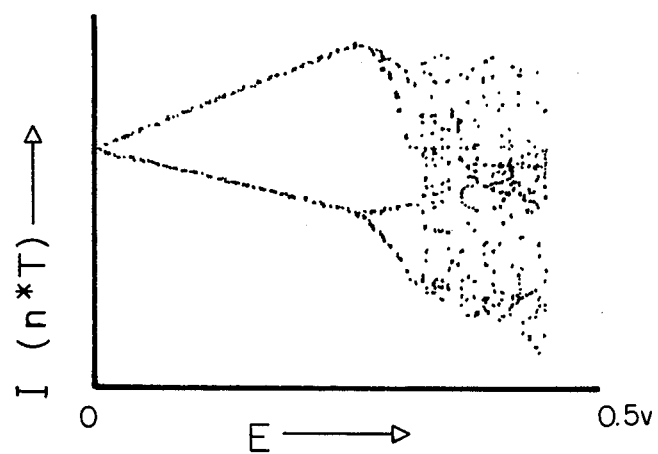
FIG. 7 is a computer-generated, frequency-division bifurcation diagram based upon a mathematical model of the frequency divider of FIG. 1A.

FIG. 7 is a computer-generated bifurcation diagram using this numerical model, wherein R=24.4Ω, L2=1.28 mh, C1=2.0 mmf, W=8.0 kHz, $i_{dc}$=1.1 ma and E varies from 0 to 0.45 volts. Above each value E on the horizontal axis, the 16 values i(n*T), for n=25,26, . . . ,40 are reported. We start with n=25 to leave time for the solution to reach a steady state, if there is any. If the steady state is periodic with period 2*T then 2 sets of 8 identical points are obtained. This is the first bifurcation. The bias level, $i_{dc}$, was set equal to $i_c$ for this diagram and the result is a very low threshold, with E being approximately equal to 0, for the first bifurcation. This condition is desirable when using the frequency divider of FIG. 1A as a transponder contained within an electronic tag in a presence detection system.

In practice, the circuit of FIG. 1A shows the lowest threshold for bifurcation when the external magnetic bias field is equivalent to the field generated by the saturation current, $i_c$, in the coil wrapped around the amorphous magnetic strip 10 of the nonlinear inductor L1; and the circuit is series resonant at one-half the frequency of the detected electromagnetic radiation at the first predetermined frequency. The biasing magnetic field may simply be the Earth's magnetic field, or a small permanent magnet placed near the nonlinear inductor.

Figure 8:
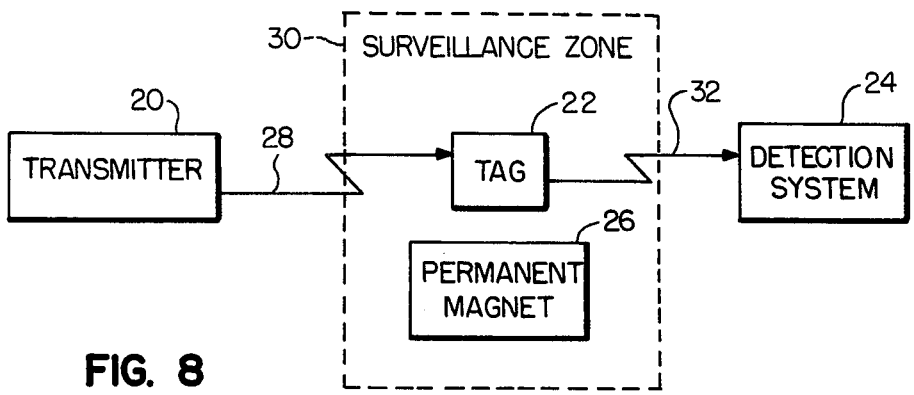
FIG. 8 is a block diagram of a presence detection system including a frequency divider according to the present invention.

This feature is utilized in a preferred embodiment of a presence detection system according to the present invention, as shown in FIG. 8. Such system includes a transmitter 20, an electronic tag 22, a detection system 24 and a permanent magnet 26.

The transmitter 20 transmits an electromagnetic radiation signal 28 of a first predetermined frequency into a surveillance zone 30.

The tag 22 is attached to an article (not shown) to be detected within the surveillance zone 30. The tag 22 includes a batteryless, portable, frequency divider constructed as described above with reference to either FIG. 1A or FIG. 2A.

The permanent magnet 26 provides an external magnetic bias field within the surveillance zone 30 that is equivalent in strength to the magnetic field generated by the saturation current in the coil would around the core of the nonlinear inductor L1 in the frequency divider in response to the detected electromagnetic radiation at the first predetermined frequency.

The detection system 24 detects electromagnetic radiation at the second frequency in the surveillance zone 30, and thereby detects the presence of the tag 22 in the surveillance zone 30.

The frequency-division bifurcation characteristic of the resonant circuit of FIG. 1A is utilized by causing the transmitter 20 to transmit electromagnetic radiation at the first frequency having an amplitude that causes the resonant circuit to transmit electromagnetic radiation at multiple subharmonics of the first frequency. The detection system 24 then must detect electromagnetic radiation 32 in the surveillance zone 30 at one or more of the multiple subharmonics in order to detect the presence of a tag 22 in the surveillance zone 30.

The present invention further provides a batteryless, portable, frequency-dividing transponder that includes an elongated thin flat ribbon of low coercivity magnetostrictive amorphous magnetic material that has a transverse uniaxial magnetic anisotropy as a result of having been annealed in a magnetic field that is transverse to the length of the ribbon and inthe plane of the ribbon, and which detects electromagnetic radiation having a given frequency and responds to the detection of said radiation by transmitting electromagnetic radiation at a subharmonic of the given frequency of the detected radiation. Such transponder is included in a tag for use in a presence detection system according to the present invention.

The uniaxial magnetic anisotropy of the ribbon defines the magnetomechanical resonant frequency characteristic of the ribbon. The ribbon has a characteristic magnetomechanical resonant frequency "f", and responds to detection of electromagnetic radiation having a frequency 2f, by transmitting electromagnetic radiation at a subharmonic of the frequency of the detected radiation. The characteristic magnetomechanical resonant frequency of the frequency-divider ribbon is dependent upon the length of the ribbon, and does not resonate unless in the presence of a magnetic bias field of a predetermined intensity.

Three exaples of amorphous magnetic materials that can be processed to provide an amorphous magnetic material ribbon that exhibits frequency-division characteristics are $Fe_{67}Co_{18}B_{14}Si_1$, $Fe_{81}B_{13.5}Si_{3.5}C_2$, and $Fe_{40}Ni_{38}Mo_4B_{18}$ which are sold by Allied-Signal Inc. Corporation of Morristown, N.J. as METGLAS 2605CO, METGLAS 2605SC and METGLAS 2826MB. It is believed that $Fe_{82}B_{12}Si_6$ and $Fe_{78}B_{19}Si_{19}$, which are described Table IV in U.S. Pat. No. 4,553,136 to Anderson, III et al., also may be processed as described herein to provide a ribbon that exhibits frequency-division characteristics.

The amorphous magnetic material is processed to provide the frequency-dividing transponder ribbon by the following process. First, the material is cut into a long narrow strip so that demagnetizing effects are very small. The cut ribbon is then annealed in the presence of a magnetic field that is transverse to the length of the ribbon and in the plane of the ribbon. A ribbon that has been so processed is referred to herein as a "frequency-divider ribbon". This process creates a transverse uniaxial magnetic anisotropy that is necessary for a large interaction between stress and strain and the orientation of the magnetic moment.

It is believed that energy is stored mechanically in the vibrations of the frequency-divider ribbon; whereas in the embodiments of FIGS. 1A and 2A, energy is stored in a capacitor. Consequently, frequency division can be achieved by the frequency-divider ribbon alone and apart from any other resonant-circuit components.

The frequency-divider ribbon has a characteristic mechanical resonant frequency that is expressed by the equation:

$$f_r = c^H/2L \qquad \text{(Eq. 13)}$$

wherein "L" is the length of the ribbon and C is the speed of sound in the ribbon.

$$c^H = 1/pS_{33}^H \qquad \text{(Eq. 14)}$$

wherein p is the density of the material and $S_{33}^H$ is the elastic constant of the ribbon material and is dependent upon the strength of any external magnetic bias field applied to the ribbon.

Frequency division does not occur unless an external magnetic bias field within a predetermined field intensity range is applied to the frequency divider ribbon.

In one example, METGLAS 2605SC material was cut into ribbons that were approximately 10 cm by 0.2 cm. The material had a thickness, as cast, in a range of about 25 to 38 microns.

These ribbons then were annealed in a transverse magnetic field of approximately 5000 Oersteds for ten minutes at approximately 394 degrees Centigrade. The ribbons then were allowed to cool to the ambient temperature with the 5000 Oersted magnetic field still applied.

The resultant frequency-divider ribbon was observed to have a characteristic magnetomechanical resonant frequency of approximately 10 kHz when an external magnetic bias field of 0.55 Oersteds was applied thereto. For an external magnetic bias field strength of 0.6 Oersteds, the characteristic magnetomechanical resonant frequency of the ribbon was approximately 9.4 kHz. As the strength of the applied field was increased above 0.6 Oersteds, the amplitude of a voltage signal induced in a coil wrapped around the ribbon of the characteristic magnetomechanical resonant frequency of the ribbon also increased to a peak and then declined to zero. The highest amplitude of the resonant signal was observed when the strength of the applied external magnetic bias field was at the peak of the elastic curve ($S_{33}^H$ vs. H), and the frequency of the detected transmitted signal was approximately twice the characteristic magnetomechanical resonant frequency of the frequency-divider ribbon.

With a 0.55 Oersted external magnetic bias field applied to the frequency-divider ribbon to produce a 10 kHz characteristic magnetomechanical resonant frequency therein, the highest amplitude subharmonic signal observed was the 10 kHz signal transmitted by the frequency-divider ribbon in response to detection of a 20 kHz transmitted signal.

The frequency-divider ribbon is included in the tag 22 in the presence detection system of FIG. 8, described above, in place of the frequency divider of FIG. 1A or FIG. 2A. The frequency of the electromagnetic radiation signal 28 transmitted by the transmitter 20 is approximately twice the characteristic magnetomechanical resonant frequency of the frequency-divider ribbon. The frequency-divider ribbon in the tag 22 detects the transmitted electromagnetic signal 28 and responds thereto by transmitting a signal 32 at a subharmonic of the frequency of the transmitted signal 28. The detection system 24 is tuned to detect a subharmonic, preferably one-half, of the frequency of the transmitted signal 28 to thereby detect the presence of the tag 22 in the surveillance zone 30. In some locations and with some frequency-divider ribbons, the strength of the Earth's magnetic field may be adequate to provide the external magnetic bias field in the surveillance zone 30, whereby the permanent magnet 26 may be omitted.

Figure 13:
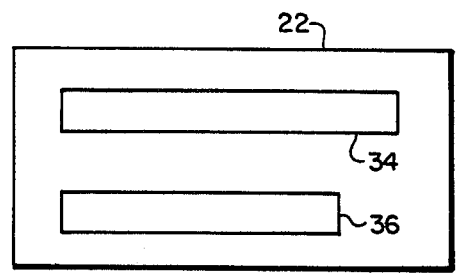
FIG. 13 illustrates a preferred embodiment of a coded tag.

In an alternative embodiment, as shown in FIG. 13, the tag 22 includes a plurality of frequency-divider ribbons 34,36 of different lengths, which thereby have different characteristic magnetomechanical resonant frequencies. Different combinations of frequency-divider ribbons are included in different tags to thereby provide uniquely-coded tags. To detect the presence of a coded tag 22 in the surveillance zone 30, the transmitter 20 provides a transmitted signal 28 that is swept over a predetermined range of frequencies that includes each of the frequencies that are twice the characteristic magnetomechanical resonant frequency of each of the frequency-divider ribbons; and the detection system 24 detects signals at each of the characteristic resonant frequencies to detect the presence of the tag 22 in the surveillance zone 30.

In another alternative embodiment, the detection system 24 detects an acoustic wave at the characteristic magnetomechanical resonant frequency of the frequency-divider ribbon to detect the presence of the tag 22 in the surveillance zone 30.

Figure 9A:
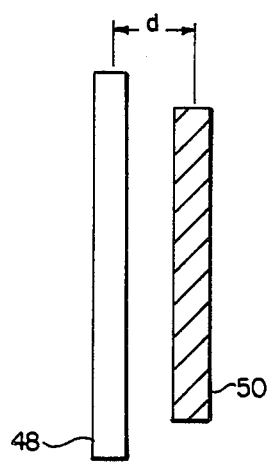
FIG. 9A shows the relative positioning of components in the tag of FIG. 9.
Figure 9:
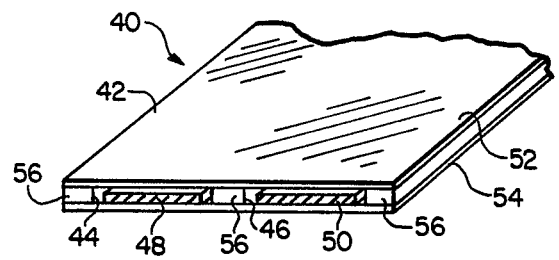
FIG. 9 illustrates a preferred embodiment of a presence-detection system tag including a transponder according to the present invention.

FIGS. 9 and 9A show a low-cost version of a frequency-dividing transponder that is useful as an antipilferage tag 40 in a presence detection system.

The tag 40 includes a housing 42 defining cavities 44 and 46 for containing an amorphous magnetic material ribbon 48 and a high remenance magnetic alloy ribbon 50, which has a relatively high coercivity compared to the amorphous ribbon 48. The housing 42 includes a paper cover 52, a paper base 54, and paper spacers 56.

The amorphous ribbon 48 must be able to vibrate freely inside the housing cavity 44 without interference or restriction, and must have no mechanical stresses impressed on it from the walls of the cavity 44. One exception to this might be to fix the amorphous ribbon 48 with a small bead of silicone adhesive at its center nodal point.

The dimensions of a typical amorphous ribbon 48 are 7 cm long by 0.25 cm wide by 30 cm thick. The dimensions of the cavity 44 need only be slightly larer than the dimensions of the ribbon 48. A suitable bias ribbon material is 0.65 to 1.0 percent carbon steel ribbon with $B_r = 9000$ gauss and 2 to 5 mils thick. The amorphous ribbon 48 is biased by a magnetic field provided by the high remenance magnetic alloy ribbon 50.

The relative positioning of the two ribbons 49 and 50 is shown in FIG. 9A. The distance, d, between the amorphous ribbon 48 and the bias ribbon 50 is adjusted so that the amorphous ribbon is at its optimum threshold for subdivision. The bias ribbon 50 does not need to move freely and can be attached directly to the housing 42 with adhesives or sandwiched between the layers 52 and 54 of the housing 42.

The transponder is enabled by permanently magnetizing the bias ribbon 50. The transponder may be disabled by authorized personnel by degaussing the bias ribbon 50 in a high A.C. magnetic field. An important advantage provided by this transponder is that it is not necessary to actually make physical contact with the transponder to deactivate it, so its location is not easily discovered.

Figure 10A:
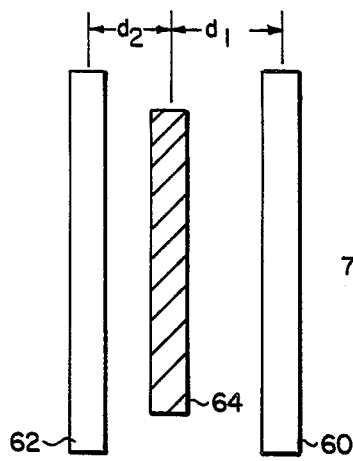
FIG. 10A shows the relative positioning of components in the tag of FIG. 10.
Figure 10:
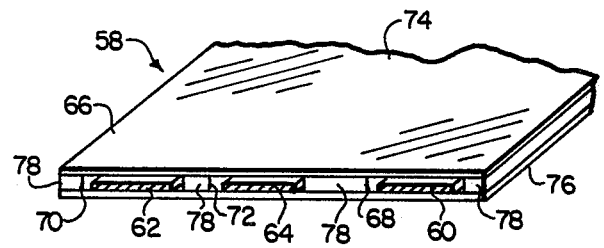
FIG. 10 illustrates another preferred embodiment of a presence-detection system tag including a transponder according to the present invention.

FIGS. 10 and 10A show a high performance version of a frequency-dividing transponder that is useful as an antipilferage tag 58 in a presence detection system. This transponder is preferred because its performance is not affected by the interference caused by the Earth's magnetic field. The Earth's magnetic field may be strong enough to significantly degrade the performance of the transponder of FIG. 9 if it happends to align with the magnetic field generated by the bias ribbon 50. The amorphous ribbon 48 responds to the sum of the component of the Earth's magnetic field along its length and the magnetic field from the bias ribbon 64.

The tag 58 includes a housing 66 defining cavities 68, 70 and 72 for containing the amorphous ribbons 60 and 62 and the bias ribbon 64 respectively. The housing 66 includes a paper cover 74, a paper base 26 and paper spacers 78. The ribbons 60, 62 and 64 are of the same materials and dimensions as used in the transponder of FIG. 9. The relative positioning of the ribbons of the transponder of FIG. 10 is shown in FIG. 10A.

Figure 11A:
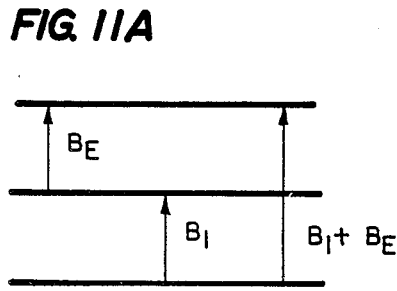
FIGS. 11A and 11B illustrates the effects of magnetic bias fields on the amorphous magnetic material ribbons in the tag of FIG. 10.
Figure 11B:
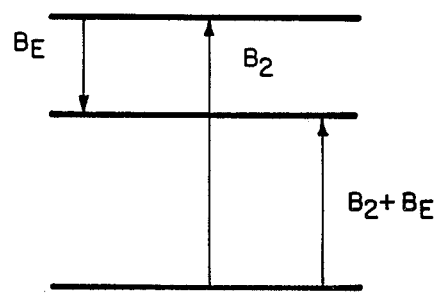
Figure 12A:
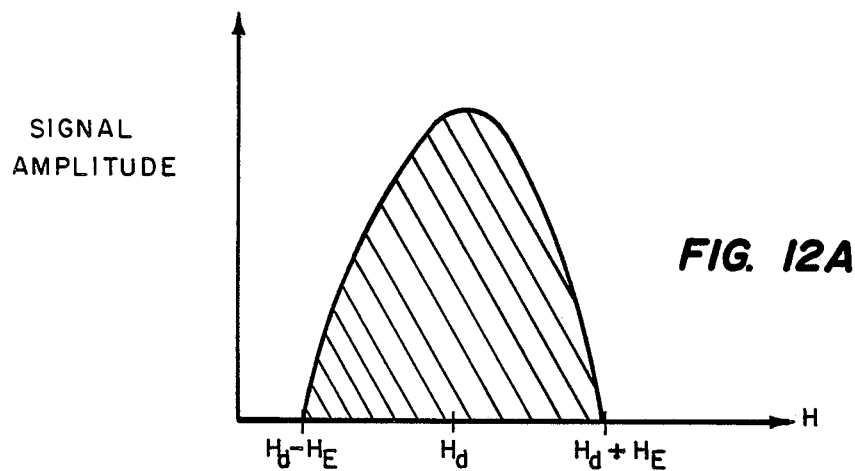
FIGS. 12A and 12B are performance graphs for the tags of FIGS. 9 and 10 respectively.
Figure 12B:
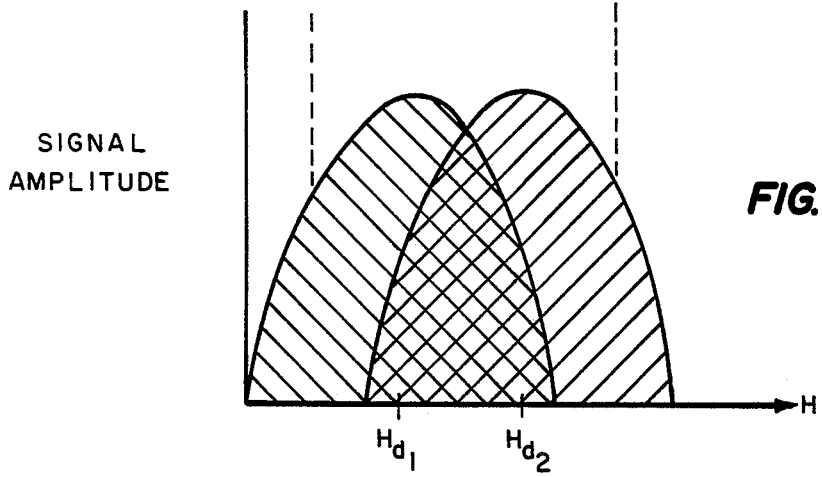

One amorphous ribbon 60 is at a distance $d_1$ from the bias ribbon 64. This amorphous ribbon 60 has an optimum magnetic bias field $B_1 + B_E$ resulting when the Earth's magnetic field $B_E$ is parallel with the length of the ribbon 60 and aiding the field $B_1$ from the bias ribbon 64. This situation is illustrated in FIG. 11A. The other amorphous ribbon 62 is at a distance d₂, which is less than d₁, from the bias ribbon 64. This second amorphous ribbon 62 has an optimum magnetic bias field $B_2$-$B_E$ resulting when the Earth's magnetic field $B_E$ is parallel with the length of the ribbon and opposing the field $B_2$ from the bias ribbon. This situation is illustrated in FIG. 11B. The advantage is that either the first amorphous ribbon 60 or the second amorphous ribbon 62 will be biased near its optimum level for frequency division, depending on how the tag 58 is oriented in the Earth's field. FIGS. 12A and 12B provide a graphical representation of the performance curves of the transponders of FIGS. 9 and 10 respectively as a function of magnetic field strength H.

Performance is measured by the amplitude of the signal at the subharmonic frequency that is transmitted by the transponder.

The high performance transponder of FIG. 10 may be enabled and disabled in a manner similar to that of the low cost transponder of FIG. 9.

We claim:

1. A batteryless, portable, transponder for detecting electromagnetic radiation at a first predetermined frequency and responding to said detection by transmitting electromagnetic radiation at a second frequency that is a subharmonic of the first frequency, comprising an amorphous magnetic material component for storing energy from the electromagnetic radiation detected at the first frequency for transmission as the electromagnetic radiation transmitted at the second frequency.

2. A transponder according to claim 1, comprising a thin, flat ribbon of low coercivity magnetostrictive amorphous magnetic material having a transverse uniaxial magnetic anisotropy defining a magnetomechanical resonant frequency "f" in accordance with the dimensions of the ribbon, when in the presence of a magnetic bias field of a predetermined intesity, wherein the ribbon responds to the detection of electromagnetic radiation having a frequency "2f" by transmitting electromagnetic radiation at a subharmonic of the frequency "2f"; and means for biasing the ribbon with said predetermined magnetic bias field.

3. A transponder according to claim 2, wherein the amorphous magnetic material of the ribbon is selected from a group consisting of $Fe_{67}Co_{18}B_{14}Si_1$, $Fe_{81}B_{13.5}Si_{3.5}C_2$, $Fe_{40}Ni_{38}Mo_4B_{18}$, $Fe_{82}B_{12}Si_6$ and $Fe_{78}B_{13}Si_{19}$.

4. A transponder according to claim 2, further comprising a housing defining a cavity that contains the ribbon and enables the ribbon to vibrate freely within the cavity without any restriction being impressed on the ribbon by the housing.

5. A transponder according to claim 4, wherein the housing further contains the biasing means and disposes the biasing means in a predetermined relationship to the ribbon to bias the ribbon with said predetermined magnetic bias field.

6. A transponder according to claim 1, comprising a pair of thin, flat ribbons of low coercivity magnetostrictive amorphous magnetic material, each ribbon having a transverse uniaxial magnetic anistropy defining a magnetomechanical resonant frequency "f" in accordance with the dimensions of the ribbon, when in the presence of a magnetic bias field of a predetermined intensity, wherein the ribbon responds to the detection of electromagnetic radiation having a frequency "2f" by transmitting electromagnetic radiation at a subharmonic of the frequency "2f";

a housing defining a plurality of cavities that contain the respective ribbons and enable the ribbons to vibrate freely within the cavities without any restrictions being impressed on the ribbons by the housing; and biasing means contained by the housing and disposed in relation to the ribbons to so magnetically bias the ribbons as to bias at least one of the ribbons with said predetermined magnetic bias field notwithstanding the orientation of the transponder with respect to the Earth's magnetic field.

7. A coded tag for attachment to an article to be detected within a surveillance zone, comprising a first batteryless, portable, transponder for detecting electromagnetic radiation at a first predetermined frequency and responding to said detection by transmitting electromagnetic radiation at a second frequency that is a subharmonic of the first frequency, including an amorphous magnetic material component for storing energy from the electromagnetic radiation detected at the first frequency for transmission as the electromagnetic radiation transmitted at the second frequency; and a second batteryless, portable, transponder for detecting electromagnetic radiation at a third predetermined frequency and responding to said detection by transmitting electromagnetic radiation at a fourth frequency that is a subharmonic of the third frequency, including an amorphous magnetic material component for storing energy from the electromagnetic radiation detected at the third frequency for transmission as the electromagnetic radiation transmitted at the fourth frequency.

8. A coded tag according to claim 7, wherein the first transponder comprises a first thin, flat ribbon of low coercivity magnetostrictive amorphous magnetic material having a transverse uniaxial magnetic anisotropy defining a first magnetomechanical resonant frequency "$f_1$" in accordance with the dimensions of the ribbon, when in the presence of a magnetic bias field of a predetermined intensity, wherein the first ribbon responds to the detection of electromagnetic radiation having a frequency "$2f_1$" by transmitting electromagnetic radiation at a subharmonic of the frequency "$2f_1$"; and means for biasing the first ribbon with said first predetermined magnetic bias field; and the second transponder comprises a second thin, flat ribbon of low coercivity magnetostrictive amorphous magnetic material having a transverse uniaxial magnetic anisotropy defining a second magnetomechanical resonant frequency resonant frequency "$f_2$" in accordance with the dimensions of the ribbon when the presence of a magnetic bias field of a predetermined intensity, wherein the second ribbon responds to the detection of electromagnetic radiation having a frequency "$2f_2$" by transmitting electromagnetic radiation at a subharmonic of the frequency "$2f_2$"; and means for biasing the second ribbon with said second predetermined magnetic bias field.

9. A coded tag according to claim 8, wherein the amorphous magnetic material of the ribbons is selected from a group consisting of $Fe_{67}Co_{18}B_{14}Si_1$, $Fe_{81}B_{13.5}Si_{3.5}C_2$, $Fe_{40}Ni_{38}Mo_4B_{18}$, $Fe_{82}B_{12}Si_6$ and $Fe_{78}B_{13}Si_{19}$.

10. A coded tag according to claim 8, further comprising
a housing defining cavities that contain the ribbons and enable the ribbons to vibrate freely within the cavities without any restrictions being impressed on the ribbons by the housing.

11. A coded tag according to claim 10, wherein the housing further contains the biasing means and disposes the biasing means in a predetermined relationship to the ribbons to bias the ribbons with said predetermined magnetic bias field.

12. A coded tag according to claim 7, comprising
a pair of thin, flat ribbons of low coercivity magnetostrictive amorphous magnetic material, the first ribbon having a transverse uniaxial magnetic anisotropy defining a first magnetomechanical resonant frequency "$f_1$" in accordance with the dimensions of the ribbon, when in the presence of a magnetic bias field of a predetermined intensity, wherein the first ribbon responds to the detection of electromagnetic radiation having a frequency "$2f_1$" by transmitting electromagnetic radiation at a subharmonic of the frequency "$2f_1$", and the second ribbon having a transverse uniaxial magnetic anisotropy defining a second magnetomechanical resonant frequency "$f_2$" in accordance with the dimensions of the ribbon, when in the presence of a magnetic bias field of a predetermined intensity, wherein the second ribbon responds to the detection of electromagnetic radiation having a frequency "$2f_2$" by transmitting electromagnetic radiation at a subharmonic of the frequency "$2f_2$";
a housing defining a plurality of cavities that contain the respective ribbons and enable the ribbons to vibrate freely within the cavities without any restriction being impressed on the ribbons by the housing; and
biasing means contained by the housing and disposed in relation to the ribbons to bias the ribbons with said predetermined magnetic bias field.

13. A presence detection system, comprising
means for transmitting an electromagnetic radiation signal of a first predetermined frequency into a surveillance zone;
a tag for attachment to an article to be detected within the surveillance zone, including a batteryless, portable, transponder for detecting electromagnetic radiation at the first predetermined frequency and responding to said detection by transmitting electromagnetic radiation at a second frequency that is a subharmonic of the first frequency, said transponder including an amorphous magnetic material component for storing energy from the electromagnetic radiation detected at the first frequency for transmission as the electromagnetic radiation transmitted at the second frequency; and
means for detecting electromagnetic radiation at the second frequency within the surveillance zone.

14. A system according to claim 13, wherein the transponder comprises
a thin, flat ribbon of low coercivity magnetostrictive amorphous magnetic material having a transverse uniaxial magnetic anisotropy defining a magnetomechanical resonant frequency "$f$" in accordance with the dimensions of the ribbon, when in the presence of a magnetic bias field of a predetermined intensity, wherein the ribbon responds to the detection of electromagnetic radiation having a frequency "$2f$" by transmitting electromagnetic radiation at a subharmonic of the frequency "$2f$"; and
means for biasing the ribbon with said predetermined magnetic bias field.

15. A system according to claim 14, wherein the amorphous magnetic material of the ribbons is selected from a group consisting of $Fe_{67}Co_{18}B_{14}Si_1$, $Fe_{81}B_{13.5}Si_{3.5}C_2$, $Fe_{40}Ni_{38}Mo_4B_{18}$, $Fe_{82}B_{12}Si_6$ and $Fe_{78}B_{13}Si_{19}$.

16. A system according to claim 14, wherein the transponder further comprises
a housing defining a cavity that contains the ribbon and enables the ribbon to vibrate freely within the cavity without any restriction being impressed on the ribbon by the housing.

17. A system according to claim 16, wherein the housing further contain the biasing means and disposes the biasing means in a predetermined relationship to the ribbon to bias the ribbon with said predetermined magnetic bias field.

18. A system according to claim 13, wherein the transponder comprises
a pair of thin, flat ribbons of low coercivity magnetostrictive amorphous magnetic material, each ribbon having a transverse uniaxial magnetic anisotropy defining a magnetomechanical resonant frequency "$f$" in accordance with the dimensions of the ribbon, when in the presence of a magnetic bias field of a predetermined intensity, wherein the ribbon responds to the detection of electromagnetic radiation having a frequency "$2f$" by transmitting electromagnetic radiation at a subharmonic of the frequency "$2f$";
a housing defining a plurality of cavities that contain the respective ribbons and enable the ribbons to vibrate freely within the cavities without any restriction being impressed on the ribbons by the housing; and
biasing means contained by the housing and disposed in relation to the ribbons to so magnetically bias the ribbons as to bias at least one of the ribbons with said predetermined magnetic bias field notwithstanding the orientation of the transponder with respect to the Earth's magnetic field.

19. A system according to claim 13, wherein the tag is a coded tag comprising
a first batteryless, portable transponder for detecting electromagnetic radiation at a first predetermined frequency and responding to said detection by transmitting electromagnetic radiation at a second frequency that is a subharmonic of the first frequency, including an amorphous magnetic material component for storing energy from the electromagnetic radiation detected at the first frequency for transmission as the electromagnetic radiation transmitted at the second frequency; and
a second batteryless, portable transponder for detecting electromagnetic radiation at a third predetermined frequency and responding to said detection by transmitting electromagnetic radiation at a fourth frequency that is a subharmonic of the third frequency, including an amorphous magnetic material component for storing energy from the electromagnetic radiation detected at the third frequency for transmission as the electromagnetic radiation transmitted at the fourth frequency.

20. A system according to claim 19, wherein
the first transponder comprises a first thin, flat ribbon of low coercivity magnetostrictive amorphous magnetic material having a transverse uniaxial magnetic anistropy defining a first magnomechanical resonant frequency "$f_1$" in accordance with the dimensions of the ribbon, when in the presence of a magnetic bias field of a predetermined intensity, wherein the first ribbon responds to the detection of electromagnetic radiation having a frequency of "$2f_1$" by transmitting electromagnetic radiation at a subharmonic of the frequency "$2f_1$"; and means for biasing the first ribbon with said predetermined magnetic bias field; and
the second transponder comprises a second thin, flat ribbon of low coercivity magnetostrictive amorphous magnetic material having a transverse uniaxial magnetic anistropy defining a second magnomechanical resonant frequency "$f_2$" in accordance with the dimensions of the ribbon, when in the presence of a magnetic bias field of a predetermined intensity, wherein the second ribbon responds to the detection of electromagnetic radiation having a frequency of "$2f_2$" by transmitting electromagnetic radiation at a subharmonic of the frequency "$2f_2$"; and means for biasing the second ribbon with said predetermined magnetic bias field.

* * * * *